United States Patent
Johnston

[15] 3,693,149
[45] Sept. 19, 1972

[54] COMPREHENSIVE TIRE PRESSURE DIFFERENTIAL SENSING AND INDICATING DEVICE

[72] Inventor: Carey W. Johnston, 172 Reldyes Ave., Leonia, N.J. 07605

[22] Filed: July 20, 1971

[21] Appl. No.: 164,366

[52] U.S. Cl. ............................... 340/58, 200/61.25
[51] Int. Cl. ............................... B60c 23/02
[58] Field of Search ......... 340/58; 200/61.22, 61.25, 61.26

[56] References Cited

UNITED STATES PATENTS

| | | | |
|---|---|---|---|
| 3,521,231 | 7/1970 | Johnston | 340/58 |
| 3,537,068 | 10/1970 | Amundsen, Jr. | 340/58 |

*Primary Examiner*—Alvin H. Waring
*Attorney*—Keith Misegades et al.

[57] ABSTRACT

An improved comprehensive tire pressure differential sensing device for furnishing selectively warnings for either excessive or insufficient normal tire pressure having in a housing a sliding piston positioned in a passageway, a spring urging said piston in a given axial direction, an air chamber formed in part by a diaphragm for receiving air under pressure urging the piston in an axial direction overcoming the force of the spring, a slot in the piston receiving a split contact pin, the pin having an insulation layer throughout its medial plane for forming two distinct electrical circuits, and circuit means for selectively indicating that an excess or inadequate pressure condition exists in a given tire.

8 Claims, 1 Drawing Figure

PATENTED SEP 19 1972 3,693,149
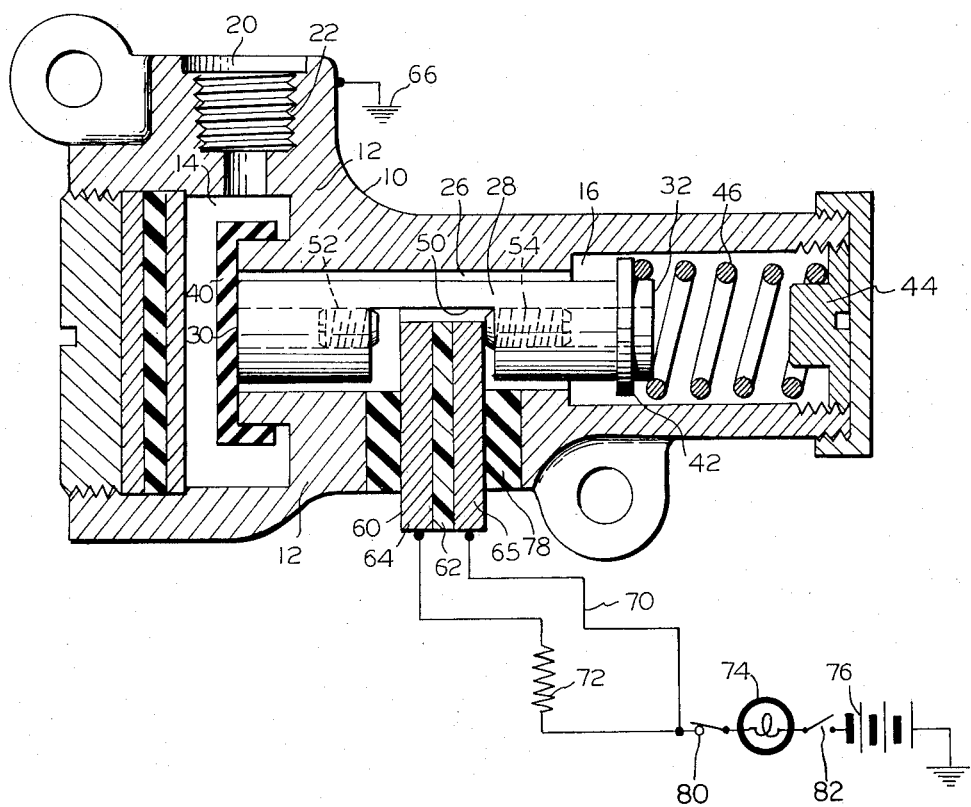
INVENTOR
CAREY W. JOHNSTON
BY Misegades & Douglas
George R. Douglas, Jr.
ATTORNEYS

COMPREHENSIVE TIRE PRESSURE DIFFERENTIAL SENSING AND INDICATING DEVICE

This application is an improved comprehensive tire pressure sensing and indicating device over that described and claimed in my U.S. Pat. No. 3,521,231, issued July 21, 1970.

BRIEF SUMMARY OF THE INVENTION

The present invention relates to an improved comprehensive tire pressure differential sensing and indicating device or system having a housing in which there are two annular chambers and a passageway therethrough, a piston disposed therein and engaging a diaphragmatic cap means, and arranged so that the piston moves in a given direction on increases of pressure and in the opposite direction on decreases or inadequacy of pressure values compared to a given normal pressure, and a two-state circuit means responsive to given incremental movements of said piston.

An object and feature of the invention therefore is to provide an improved comprehensive tire pressure differential sensing and indicating device operative for a two-state circuit means responsive to given incremental movements of a sliding piston for selectively indicating either excessive or insufficient values of tire pressures.

A further object and advantage of the invention is to provide comprehensive tire pressure differential sensing and indicating means responsive to the sensing of excessive pressures above a given normal, as well as inadequate pressure values thereof in a selective fashion.

An additional object and advantage of the invention is to provide a comprehensive system which includes means to adjust or modify the limits of indication by providing adjustable means within a piston to pre-set the point at which the sensing means actuates a two-state circuit means responsive to given incremental movements of the piston.

Another object of the invention is to provide a comprehensive tire pressure differential sensing and indicating device including a single or sole means responsive to selection of either excessive or inadequate pressure conditions for two-state circuit or actuating means.

An additional object of the invention is to provide such a comprehensive system including a divided contact arm member having each segment thereof connected with an independent electrical indicating circuit, one circuit including an electrical resistor means to produce a dim light signal, and the other circuit means absent such resistor means to produce a bright or normal light signal.

BRIEF DESCRIPTION OF THE SEVERAL VIEWS OF THE DRAWINGS

The above and other objects and advantages of the invention will become apparent upon full consideration of the following detailed description and accompanying drawings in which:

The FIGURE is a cross-sectional view showing an essentially vertical section through a comprehensive tire pressure differential sensing and indicating device according to a preferred embodiment of the invention, and in which the best mode presently contemplated by the inventor is shown for carrying out the invention.

DETAILED DESCRIPTION

Referring now to the drawings, there is shown a housing 10 within which there is at least one partition 12 for defining a pressure chamber 14 on one side of the partition 12,12, while there is an adjustably configured closed chamber 16 on the other side of the partition 12,12.

A communicating air conduit 20 connects the pressure chamber 14 to a tire valve system through an opening 22 in the housing 10.

There is seen provided in the partition 12,12, a transverse passageway 26 within which there is a sliding piston 28 which is positioned for essentially filling the passageway 26 so that one end 30 of the piston extends into the pressure chamber 14, and the other end 32 extends into and within the adjustably configured closed chamber 16.

One end of the passageway passes through the partition forming a wall of the pressure chamber. Projecting from the lateral face of the partition is an axially aligned annular projection encompassing the projection of the piston. A diaphragmatic cap means 40 is mounted over this projection to seal the passageway 26, also in response to a differential pressure between the pressure chamber and the transverse passageway, to transmit this differential to the piston and to move it accordingly.

The adjustably configured closed chamber 16 remains clear of the flanged means 42 fixed on the other end of the piston, and may terminate in a threaded engagement with the flange element 44. There is a helical spring 46 that engagingly mates with the flanged means 42 and the flanged member 44, and which generally supports and exerts the piston 28 into a leftward direction against the diaphragmatic cap means 40. The outer medial face of the flanged member 44 may have a diametrical slot for engaging with a screw driver or similar tool, not shown.

In the medial surface of the piston 28, there is a transverse slot 50 in the outer surface thereof, and its utilized configuration may be accordingly adjusted by an eccentrically disposed adjusting means 52,54, or both as may be desired, and thus adjust or vary the utilized length of the slot 50. There extends radially into the transverse slot 50 a split contact pin 60 formed of two metal parts hemispherically or otherwise contoured and separated from each other along an axial plane thereof by an insulation layer 62 to form portions of two distinct electrical circuits, and which thus may form a two-state system of current conduction to an indicator circuit means or the like. The pin 60 may be securely mounted within the housing 10, as shown in the drawing, and when the piston 28 is caused to traverse the passageway so that an end wall of the slot 50, or an adjusting means 52,54 engages one of the two metal parts 64,65 of the contact pin 60, an electrical circuit may be completed. The housing 10 may be grounded as convenient at point 66, and if the piston engages of the metal parts 64,65, a circuit is formed. For example, through conductor 70 or through impedance and conductor circuit 72, there is formed conduction through a lamp device 74 when a battery 76 is connected to the lamp and the ground potential, respectively. The electrical impedance of the resistance 72 may be in the order of 100 ohms. It is noted that the pin 60 is imbedded in the housing within an insulating material 78, such as rubber or other elastomeric material having insulation characteristics.

When the air pressure in chamber 14 is above a normal given condition, the diaphragmatic cap means 40 is driven rightwardly with reference to the drawing until the left metal member 64 engages a wall of the slot or its adjusting means, the conductor 72 is energized, the lamp 74 is dimly illuminated, thus indicating the tire pressure is characteristically excessive. On the other hand, if the tire pressure is inadequate, as indicated by the fully illuminated lamp 74, the circuit 70, including the slot wall, or its adjusting means, and the metal part 65 has been completed.

Thus, it is seen that the device and system of the invention will primarily employ a sliding piston 28 in which the transverse slot 50 by engaging the two metal parts 64,65 provides a two-state circuit means responsive to given incremental movements of the piston for indicating either insufficient or excessive pressure conditions for the tire under consideration. Of course, it is within the purview of the invention that the spring 46 may be adjusted by moving the threaded member 44 along the threaded portion within its engaging walls, or various characteristic spring members may be used for locating the piston 28 in a normal or static coneition as it engages the diaphragmatic cap means 40.

It is apparent that the circuit may be supplied with an ignition key switch such as the switch 46 shown in referenced U.S. Pat. to Johnston No. 3,521,231, which is a well-known expedient in connecting electrical accessories to key-operated electrical circuits in automotive circuits. Also the invention includes a collector ring assembly in the circuit leading from the split contact 64,65 to the signal lamp device 74. This is the assembly consisting of the circular ring mounted inside the brake drum, thus revolving with the wheel and drum. The aforementioned patent also shows how it is installed directly opposite to the stationary backing plate of the brake assembly wherein there is mounted a spring-loaded brush assembly whose graphite brush bears gently on the collector ring to complete the electrical circuit between the revolving drum and the stationary frame of the vehicle.

Additional embodiments of the invention is this specification will occur to others and therefore it is intended that the true spirit of the invention be limited only by the appended claims and not by the embodiment described hereinabove. Accordingly, reference should be made to the following claims in determining the true spirit of the invention.

What is claimed is:

1. An improved tire pressure differential sensing device comprising:

a housing having at least a partition therein defining a pressure chamber on one side and an adjustably configured closed chamber on the other side, means for connecting a tire valve stem to an opening for said pressure chamber, a transverse passageway in said partition, a sliding piston positioned within said passageway with an end portion thereof extending into said pressure chamber and the other end portion thereof extending into said adjustably configured closed chamber, an axially arranged annular chamber defined by an annular wall portion in the pressure chamber at the side of said partition encompassing the projecting end of said piston, diaphragmatic cap means sealing said annular chamber at the outer end for differential pressure in said pressure chamber urging said cap means into engagement with said piston to move said piston, a flanged means affixed on said other end portion of said piston and a flanged means threaddedly engaging an inner wall of said closed chamber, spring means mating at one end with the flanged means of the piston and at the other with the threaded flanged means, a transverse slot in the outer medial face of said piston, and a split contact pin formed of two conductive parts separated along an axial plane thereof by an insulation layer to form portions of two distinct electrical circuits, said split contact pin mounted in an insulating means in the wall of said housing and projecting between the walls defining the slot in said piston for engaging selectively the wall of the slot when the piston is moved to one of the two end positions to close contact between one of the respective conductive parts and the piston.

2. The invention of claim 1 wherein one of the conductive parts is in circuit with an impedance and an indicator lamp means connected to a source of power connected to said piston and wherein the other of the conductive parts is in circuit directly with said indicator lamp means.

3. The invention of claim 1 wherein an adjustment directed member is disposed within the piston for providing manual adjustment to the utilized sizing of the slot.

4. The invention of claim 1 wherein said piston upon being displaced for actuation of split contact pin comprises a comprehensive tire pressure differential sensing and indicating device responsive selectively to excessive or inadequate pressure responsive actuating means.

5. The invention of claim 1 wherein said device is a comprehensive tire pressure differentially actuated sensing and indicating device, including means to modify the extent of pressure variation, said modifying means comprising a means disposed with said piston for adjustment thereof.

6. The invention of claim 1 wherein said device is a comprehensive tire pressure differential sensing and indicating device, including a sole means responsive selectively to either excessive or inadequate pressure actuating means.

7. The invention of claim 1 wherein said device is a comprehensive tire pressure differential sensing and indicating device including said contact pin for selectively indicating excessive or inadequate condition of pressure in said tire.

8. The invention of claim 1 wherein said pin is a two-state circuit means responsive to given incremental movements of said piston.

* * * * *